US008610416B2

(12) United States Patent
Gao

(10) Patent No.: US 8,610,416 B2
(45) Date of Patent: *Dec. 17, 2013

(54) SELF-DRIVEN SYNCHRONOUS RECTIFICATION BOOST CONVERTER

(75) Inventor: Xin-Ming Gao, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 151 days.

This patent is subject to a terminal disclaimer.

(21) Appl. No.: 13/260,320

(22) PCT Filed: Jun. 20, 2011

(86) PCT No.: PCT/CN2011/075919
§ 371 (c)(1),
(2), (4) Date: Sep. 25, 2011

(87) PCT Pub. No.: WO2012/171227
PCT Pub. Date: Dec. 20, 2012

(65) Prior Publication Data
US 2012/0313599 A1  Dec. 13, 2012

(30) Foreign Application Priority Data
Jun. 11, 2011 (CN) .................. 2011 2 0196860 U

(51) Int. Cl.
*G05F 1/56* (2006.01)
(52) U.S. Cl.
USPC .......................... 323/282; 323/222

(58) Field of Classification Search
USPC ................. 323/222, 225, 282, 311, 351; 363/21.06, 21.14, 127
See application file for complete search history.

(56) References Cited

U.S. PATENT DOCUMENTS

| 6,822,427 | B2 * | 11/2004 | Wittenbreder | 323/282 |
| RE41,766 | E * | 9/2010 | Soldano | 323/222 |
| 2003/0235059 | A1 * | 12/2003 | Perry | 363/21.06 |
| 2007/0047267 | A1 | 3/2007 | Nishikawa | |
| 2012/0313611 | A1 * | 12/2012 | Gao | 323/311 |

FOREIGN PATENT DOCUMENTS

| CN | 1925296 A | 3/2007 |
| JP | 5-268762 A | 10/1993 |
| JP | 2009-142020 A | 6/2009 |

* cited by examiner

*Primary Examiner* — Adolf Berhane
(74) *Attorney, Agent, or Firm* — Cheng-Ju Chiang

(57) ABSTRACT

The present invention provides a self-driven synchronous rectification boost converter. The self-driven synchronous rectification boost converter has a first switch receiving a pulse driving signal, a first winding and a synchronous rectification circuit constructed by an auxiliary winding and a second switch. The first winding stores energy when the first switch is switched on and releases energy when the first switch is switched off to achieve boosting. In the meantime, the auxiliary winding cooperates with a switch circuit to switch on/off the second switch according to a voltage inducted from the first winding, so as to achieve an object of synchronous rectification. Under a condition of outputting high current, the present invention can greatly reduce power-consumption of rectifying and enhance efficiency.

6 Claims, 3 Drawing Sheets

US 8,610,416 B2

SELF-DRIVEN SYNCHRONOUS RECTIFICATION BOOST CONVERTER

FIELD OF THE INVENTION

The present invention relates to a boost converter, and more particularly to a self-driven synchronous rectification boost converter.

BACKGROUND OF THE INVENTION

With reference to FIG. 1, a conventional boost circuit for driving a backlight module of a liquid crystal display device mainly has an input power Vin, a first winding L1 connected to the input power Vin, a diode D1 connected between the first winding L1 and an output capacitor, and a transistor switch Q1 connected between the first winding L1 and the diode D1.

The boost circuit uses the action of repeatedly switching on-and-off of the transistor switch Q1 to control the first winding L1 to output a forward voltage, and then to charge the output capacitor together with input power Vin, so that the output capacitor can provide an output voltage Vo higher than the input voltage Vin to the backlight module on a load end.

Foregoing boost circuit implements a boosting effect that the output voltage is higher than the input voltage. However, since the boost circuit uses the diode D1 for rectification, as the circuit outputs a large current, power consumption of the diode on reification will become extremely large and cause the efficiency of the boost circuit to decrease and has a problem of heat dissipation. If the boost circuit uses a MOSFET for rectification, the circuit needs to be driven with a floating ground isolation, which causes design of the circuit to be more complicated.

Hence, it is necessary to provide a self-driven synchronous rectification boost converter to overcome the problems existing in the conventional technology.

SUMMARY OF THE INVENTION

The present invention provides a self-driven synchronous rectification boost converter to overcome the problem of high power-consumption on using diode rectifier in the conventional technology.

A primary object of the present invention is to provide a self-driven synchronous rectification boost converter that uses an auxiliary winding and a peripheral circuit to implement a self-driven synchronous rectification that a power transistor MOSFET with low on-resistance is used to replace diode rectification and is capable of lowering power-consumption on rectification to improve performance of the converter and achieve high efficiency.

To achieve the above object, the present invention provides a self-driven synchronous rectification boost converter comprising:

a first switch receiving a pulse driving signal and being repeatedly switched on/off according to the pulse driving signal;

a first winding connected between an input voltage source and the first switch, storing energy when the first switch is switched on and release energy when the first switch is switched off;

an auxiliary winding connected to the first winding and the first switch;

a switch circuit connected to the auxiliary winding and outputting a control signal according to the change of the terminal voltage of the auxiliary winding; and a second switch connected to the switch circuit and receiving the control signal and being switched on or off according to the control signal.

In one embodiment of the present invention, the first switch and the second switch are N channel MOSFETs.

In one embodiment of the present invention, the switch circuit includes a diode and a third switch, wherein the anode of the diode is connected to a terminal of the auxiliary winding; the third switch is connected between the cathode of the diode and the second switch; when the terminal voltage of the auxiliary winding is a forward voltage, the diode is in an on state, and the third switch is in an off state, the second switch is in an on state; and when the terminal voltage of the auxiliary winding is a reverse voltage, the diode is in an off state, and the third switch is in an on state, the second switch is in an off state.

In one embodiment of the present invention, the third switch is a transistor, and the emitter of the third switch is connected to the cathode of the diode through a resistor and connected to the gate of the second switch through another resistor; the base of the third switch is connected between the anode of the diode and a terminal of the auxiliary winding through a resistor; the collector of the third switch is connected between the other terminal of the auxiliary winding and the source of the second switch.

In one embodiment of the present invention, when the pulse driving signal received by the first switch is in a high electric potential, the first switch is in an on state, the first winding is in an energy-storing state, the terminal voltage of the auxiliary winding is a forward voltage; when the pulse driving signal received by the first switch is in a low electric potential, the first switch is in an off state, a terminal voltage of the first winding is a reverse voltage, and the terminal voltage of the auxiliary winding is a reverse voltage.

In one embodiment of the present invention, the dotted terminal of the first winding is connected to the input voltage source and the non-dotted terminal thereof is connected to the drain of the first switch; the dotted terminal of the auxiliary winding is connected to the source of the first switch and the collector of the third switch, and the non-dotted terminal of the auxiliary winding is connected to the base of the third switch.

The present invention is to use the auxiliary winding operating with the switch circuit to control the action of rectifying switch. The present invention implements a self-driven synchronous rectification that replaces conventional diode rectification technology, enhances operation efficiency and lowers power-consumption.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
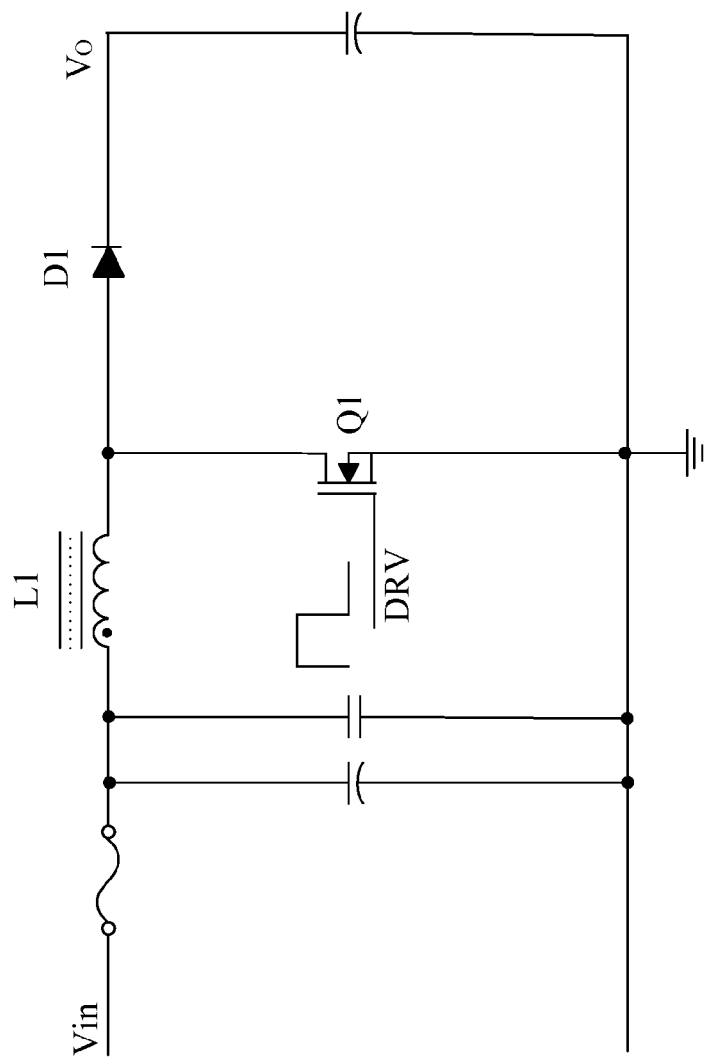
FIG. 1 is a circuit diagram of a boost circuit for driving a backlight module of a liquid crystal display device in accordance with the prior art.
Figure 2:
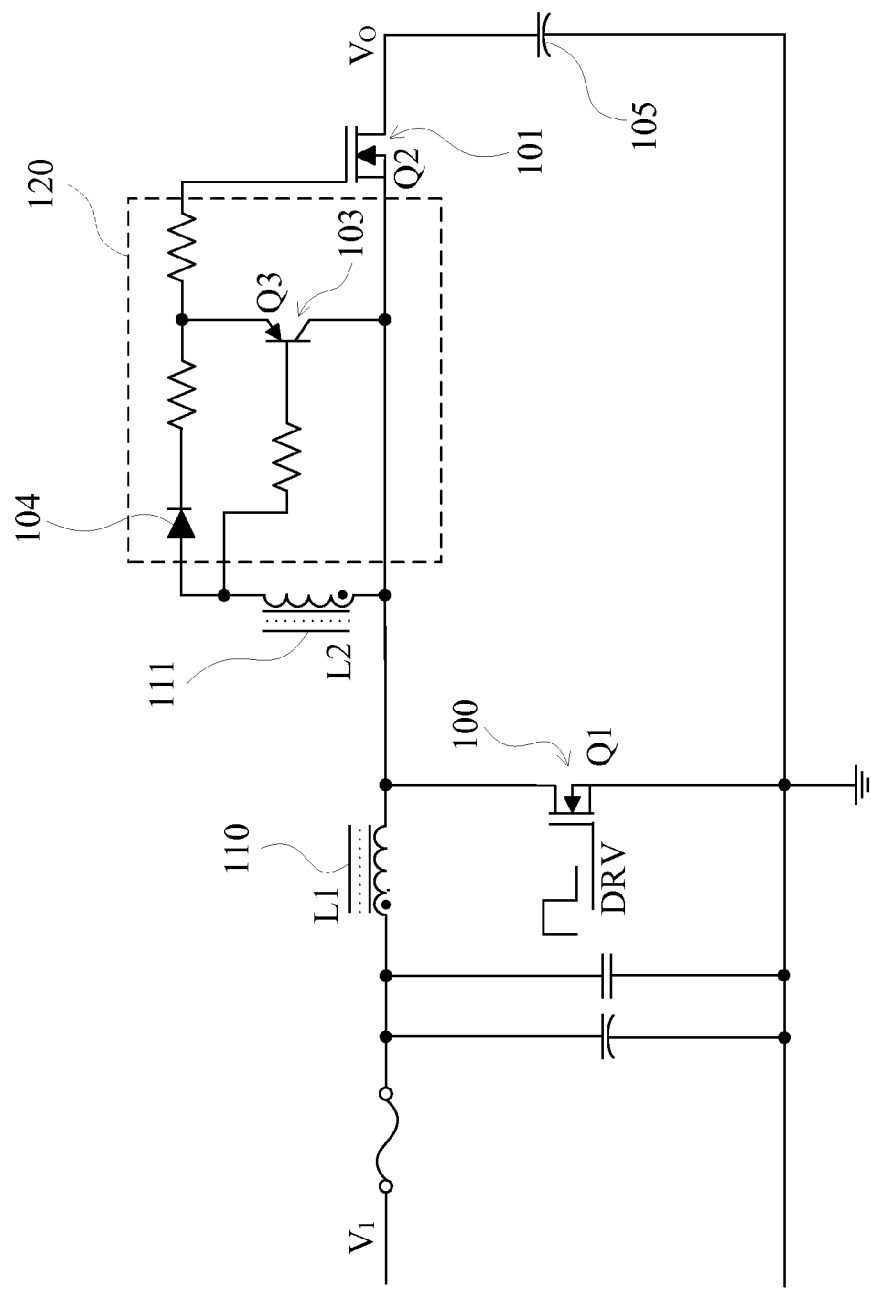
FIG. 2 is a circuit diagram of a preferred embodiment of a self-driven synchronous rectification boost converter in accordance with the present invention.

With reference to FIG. 2, FIG. 2 is a circuit diagram of a preferred embodiment of a self-driven synchronous rectification boost converter in accordance with the present invention. The self-driven synchronous rectification boost converter mainly comprises a first switch 100, a first winding 110, an auxiliary winding 111, a switch circuit 120 and a second switch 101.

Figure 3:
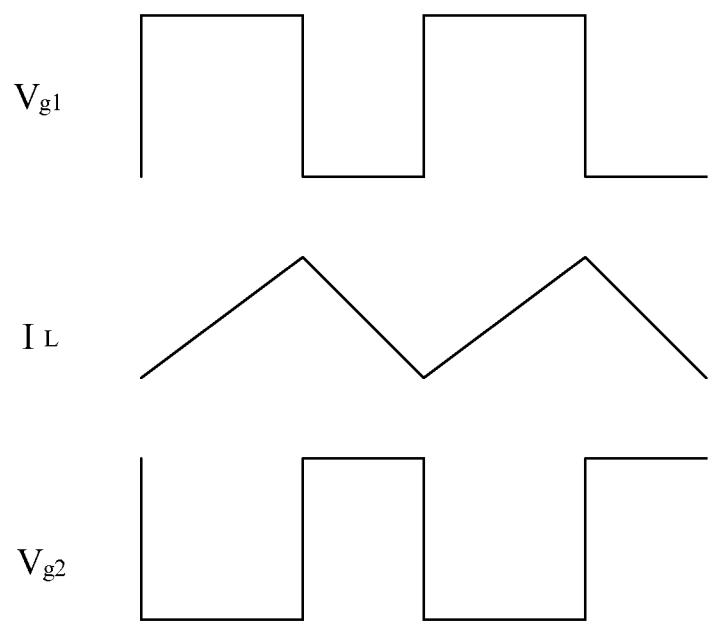
FIG. 3 is a wave diagram relative to voltage and current according to a preferred embodiment of a self-driven synchronous rectification boost converter of the present invention.

The first switch 100 is used to receive a pulse driving signal Vg1 having high and low electric potentials, and is thereby driven by the pulse driving signal Vg1 to be repeatedly switched on and off. The pulse driving signal Vg1 is shown in FIG. 3, the first switch 100 is switched on in high electric potential and switched off in low electric potential, therefore the first switch has a switching period T, a conducting time Ton, and a duty ratio D=Ton/T. In this embodiment, the first switch is an N-channel MOSFET.

The first winding 110 is connected between an input voltage source V1 and the first switch 100, wherein the dotted terminal thereof is connected to the input voltage source V1, and the non-dotted terminal thereof is connected to the drain of the first switch 100. The first winding 110 stores energy when the first switch 100 is switched on, and the electric potential on the dotted terminal thereof is higher than the electric potential on the non-dotted terminal thereof in the meantime. Besides, when the first switch 100 is switched off, the terminals of the first winding 110 inducts a reverse voltage, and in the meantime the electric potential on the non-dotted terminal is higher than the dotted terminal. In this embodiment, when the first switch 100 is switched off, a terminal voltage on the drain thereof is V1/(1−D), and the reverse voltage on the terminals of the first winding 110 is V1(1−D)−V1=V1D/(1−D).

The auxiliary winding 111 is connected to the first winding 110 and the first switch 100, wherein the dotted terminal of the auxiliary winding 111 is connected to the drain of the first switch 100 and the non-dotted terminal of the first winding 110. In this embodiment, the winding ratio of the auxiliary winding 111 to the first winding 110 is N:1. When the first winding 110 is in energy-storing state, the electric potential on the dotted terminal of the auxiliary winding 111 is higher than the electric potential on the non-dotted terminal thereof; when the first winding 110 is inducting a reverse voltage of V1D/(1−D), the electric potential on the non-dotted terminal of the auxiliary winding 111 is higher than the electric potential on the dotted terminal thereof, and a terminal voltage thereof is N*V1D/(1−D).

The switch circuit 120 is connected to the auxiliary winding 111 and outputs a control signal according to the change of the terminal voltage of the auxiliary winding 111. In this embodiment, the switch circuit 120 includes a diode 104 and a third switch 103. In this embodiment, the anode of the diode 104 is connected to the non-dotted terminal of the auxiliary winding 111. The third switch 103 is connected to the cathode of the diode 104. In this embodiment, when the terminal voltage of the auxiliary winding 111 is a forward voltage, the diode 104 is in an on state and the third switch 103 is in an off state; when the terminal voltage of the auxiliary winding 111 is a reverse voltage, the diode 104 is in an off state and the third switch 103 is in an on state. The third switch 103 is preferably a transistor, wherein the emitter thereof is connected to the cathode of the diode 104 via a resistor, the base thereof is connected between the anode of the diode 104 and the non-dotted terminal of the auxiliary winding 111 via another resistor; and the collector thereof is connected to the dotted terminal of the auxiliary winding 111.

The second switch 101 is connected to the switch circuit 120 and receives the control signal and is switched on or off according to the control signal. When the third switch 103 is in an off state, the second switch 101 is in an on state; when the third switch 103 is in an on state, the second switch 101 is in an off state. In more details, the second switch 101 is an N-channel MOSFET, the gate thereof is connected to the emitter of the third switch 103 via a resistor; the source thereof is connected to the collector of the third switch 103; and the drain thereof is connected to an output capacitor 105.

When the pulse driving signal Vg1 is in high electric potential, the first switch 100 is in an on state, the first winding 110 is in an energy-storing state. With reference to FIG. 3, the current $I_L$ through the first winding 110 is linearly increasing by a slope of V1/L (L is the inductor value of the first winding 110), the terminal voltage of the auxiliary winding 111 is then a forward voltage, and the diode 104 is in an off state, and the third switch 103 is in an on state. Since the gate of the second switch 101 is connected to the source of the third switch 103, the second switch 101 is thereby in an off state.

When the pulse driving signal Vg1 is in low electric potential, the first switch 100 is in an off state, the terminal voltage of the first winding 110 is a reverse voltage, the terminal voltage of the auxiliary winding 111 is a reverse voltage, and the diode 104 is in an on state, and the third switch is in an off state, the second switch 101 is switched on since the voltage applied to the gate of the second switch 101 is higher than the voltage applied to the source thereof, so as to achieve synchronous rectification. With reference to FIG. 3, a wave form of a signal Vg2 that drives the second switch 101 is opposite to the wave form of the pulse driving signal in phase.

With the foregoing description, the present invention utilizes the auxiliary winding 111 to synchronously induct the current variation of the first winding 110 in the front stage and changes terminal voltage between forward and reverse voltages and then to cooperate with the diode 104 and the third switch 103 to control the second switch 101 to be switched on and off, so as to achieve self-driven synchronous rectification. When applying to a large-sized backlight driving circuit, since the load has a large amount of parallel-connections and has a large output current, the present invention uses a MOSFET, the second switch, to replace conventional diode on rectification, is able to enhance working efficiency and lower power-consumption. Besides, self-driven synchronous rectification does not require a floating ground isolation, and thereby has lower cost.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A self-driven synchronous rectification boost converter, wherein the self-driven synchronous rectification boost converter comprises:
   a first switch receiving a pulse driving signal and being repeatedly switched on/off according to the pulse driving signal;

a first winding connected between an input voltage source and the first switch, storing energy when the first switch is switched on and releasing energy when the first switch is switched off;

an auxiliary winding connected to the first winding and the first switch;

a second switch; and a switch circuit connected to the auxiliary winding and having a diode and a third switch, and the anode of the diode is connected to a terminal of the auxiliary winding; the third switch is connected to the cathode of the diode and the second switch, and when the terminal voltage of the auxiliary winding is a forward voltage, the diode is in an on state, the third switch is in an off state, the second switch is in an on state; when the terminal voltage of the auxiliary winding is a reverse voltage, the diode is in an off state, and the third switch is in an on state, the second switch is in an off state.

2. A self-driven synchronous rectification boost converter, wherein the self-driven synchronous rectification boost converter comprises:

a first switch receiving a pulse driving signal and being repeatedly switched on/off according to the pulse driving signal;

a first winding connected between an input voltage source and the first switch, storing energy when the first switch is switched on and releasing energy when the first switch is switched off;

an auxiliary winding connected to the first winding and the first switch;

a switch circuit connected to the auxiliary winding and outputting a control signal according to the change of the terminal voltage of the auxiliary winding; and a second switch connected to the switch circuit and receiving the control signal and being switched on or off according to the control signal, wherein the first switch and the second switch are N channel MOSFETs; and the switch circuit includes a diode and a third switch, wherein the anode of the diode is connected to a terminal of the auxiliary winding; the third switch is connected between he cathode of the diode and the second switch; when the terminal voltage of the auxiliary winding is a forward voltage, the diode is in an on state, and the third switch is in an off state, the second switch is in an on state, and when the terminal voltage of the auxiliary winding is a reverse voltage, the diode is in an off state, and the third switch is in an on state, the second switch is in an off state.

3. The self-driven synchronous rectification boost converter as claimed in claim 2, wherein the third switch is a transistor, and the emitter of the third switch is connected to the cathode of the diode through a resistor and connected to the gate of the second switch through another resistor; the base of the third switch is connected between the anode of the diode and a terminal of the auxiliary winding through a resistor; the collector of the third switch is connected between the other terminal of the auxiliary winding and the source of the second switch.

4. The self-driven synchronous rectification boost converter as claimed in claim 2, wherein when the pulse driving signal received by the first switch is in a high electric potential, the first switch is in an on state, the first winding is in an energy-storing state, the terminal voltage of the auxiliary winding is a forward voltage; when the pulse driving signal received by the first switch is in a low electric potential, the first switch is in an off state, terminal voltage of the first winding is a reverse voltage, and the terminal voltage of the auxiliary winding is a reverse voltage.

5. The self-driven synchronous rectification boost converter as claimed in claim 3, wherein when the pulse driving signal received by the first switch is in a high electric potential, the first switch is in an on state, the first winding is in an energy-storing state, the terminal voltage of the auxiliary winding is a forward voltage; when the pulse driving signal received by the first switch is in a low electric potential, the first switch is in an off state, terminal voltage of the first winding is a reverse voltage, and the terminal voltage of the auxiliary winding is a reverse voltage.

6. The self-driven synchronous rectification boost converter as claimed in claim 3, wherein the dotted terminal of the first winding is connected to the input voltage source and the non-dotted terminal thereof is connected to the drain of the first switch; the dotted terminal of the auxiliary winding is connected to the source of the first switch and the collector of the third switch, and the non-dotted terminal of the auxiliary winding is connected to the base of the third switch.

* * * * *